US010083331B2

(12) United States Patent
Ackley et al.

(10) Patent No.: US 10,083,331 B2
(45) Date of Patent: *Sep. 25, 2018

(54) POSITIONING AN OBJECT WITH RESPECT TO A TARGET LOCATION

(71) Applicant: Hand Held Products, Inc., Fort Mill, SC (US)

(72) Inventors: H. Sprague Ackley, Seattle, WA (US); Jean-Pierre Stang, Auzeville-Tolosane (FR); Khalid El Akel, Castanet-Tolosan (FR)

(73) Assignee: Hand Held Products, Inc., Fort Mills, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/590,599

(22) Filed: May 9, 2017

(65) Prior Publication Data
US 2017/0243039 A1 Aug. 24, 2017

Related U.S. Application Data

(63) Continuation of application No. 14/851,645, filed on Sep. 11, 2015, now Pat. No. 9,652,648.

(51) Int. Cl.
G06K 7/10 (2006.01)
G06K 7/14 (2006.01)

(52) U.S. Cl.
CPC ....... G06K 7/1413 (2013.01); G06K 7/10554 (2013.01); G06K 2007/10524 (2013.01)

(58) Field of Classification Search
CPC .. G06K 7/14; G06K 7/10861; G06K 7/10851; G06K 7/10722; G06K 7/10811;
(Continued)

(56) References Cited

U.S. PATENT DOCUMENTS 6,832,725 B2 12/2004 Gardiner et al.
7,128,266 B2 10/2006 Zhu et al.
(Continued)

FOREIGN PATENT DOCUMENTS

JP  2010-237047 A    10/2010
WO  2013163789 A1   11/2013
(Continued)

OTHER PUBLICATIONS

U.S. Appl. No. 14/715,916 for Evaluating Image Values filed May 19, 2015 (Ackley); 60 pages.
(Continued)

Primary Examiner — Thien M Le
(74) Attorney, Agent, or Firm — Additon, Higgins & Pendleton, P.A.

(57) ABSTRACT

Systems and methods are provided for positioning an object with respect to a target location, such as for auto-focusing. One implementation includes a positioning device, which includes a reference object having a plurality of dark-shaded bars arranged in parallel with and separated from each other by spaces equal to a width of each of the bars. The positioning device also includes a motor configured to move in a reciprocating manner and a sensor configured to sense at least one of the bars or spaces. The motor is connected to the reference object or the sensor and moves the reference object or sensor with respect to the other. The motor is configured to stop at a target location in two phases of motion.

20 Claims, 5 Drawing Sheets

(58) Field of Classification Search
CPC .. G06K 7/1413; G06K 7/1417; G06K 7/1465; G02F 1/13306; G02F 1/133524; G02F 1/133553; G02F 1/1336
USPC .................................................. 235/462.24
See application file for complete search history.

(56) References Cited

U.S. PATENT DOCUMENTS

| | | | |
|---|---|---|---|
| 7,159,783 B2 | 1/2007 | Walczyk et al. | |
| 7,164,810 B2 * | 1/2007 | Schnee ................ | G06K 9/2009 235/462.01 |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |
| 8,910,875 B2 | 12/2014 | Ren et al. | |
| 8,914,290 B2 | 12/2014 | Hendrickson et al. | |
| 8,914,788 B2 | 12/2014 | Pettinelli et al. | |

(56) References Cited

U.S. PATENT DOCUMENTS

| | | |
|---|---|---|
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,443,123 B2 | 1/2016 | Hejl |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,222 B2 | 9/2016 | Singel et al. |
| 9,478,113 B2 | 10/2016 | Xie et al. |
| 9,652,648 B2 * | 5/2017 | Ackley ............. G06K 7/10831 |
| 2002/0066782 A1 * | 6/2002 | Swaminathan ... G06F 17/30017 235/375 |
| 2004/0050937 A1 * | 3/2004 | Barkan ............. G06K 7/10613 235/462.36 |
| 2006/0097051 A1 | 5/2006 | Foo et al. |
| 2006/0114341 A1 | 6/2006 | Morinaga et al. |
| 2006/0224051 A1 * | 10/2006 | Teller ................. A61B 5/02055 600/300 |
| 2007/0063048 A1 | 3/2007 | Havens et al. |
| 2008/0017722 A1 * | 1/2008 | Snyder ................... G06Q 10/00 235/494 |
| 2009/0108071 A1 * | 4/2009 | Carlson ............. G06K 7/10722 235/462.32 |
| 2009/0134221 A1 | 5/2009 | Zhu et al. |
| 2010/0155482 A1 * | 6/2010 | Fabian ............. G06K 7/10722 235/462.22 |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0271711 A1 | 10/2010 | Yoshida et al. |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0015336 A1 | 1/2013 | Ohno et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedrao |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0100813 A1 | 1/2014 | Showering |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |

(56) References Cited

U.S. PATENT DOCUMENTS

| | | |
|---|---|---|
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Lui et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0171720 A1 | 6/2016 | Todeschini |
| 2016/0178479 A1 | 6/2016 | Goldsmith |

(56) References Cited

U.S. PATENT DOCUMENTS

| | | |
|---|---|---|
| 2016/0180678 A1 | 6/2016 | Ackley et al. |
| 2016/0189087 A1 | 6/2016 | Morton et al. |
| 2016/0125873 A1 | 7/2016 | Braho et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |

FOREIGN PATENT DOCUMENTS

| | | |
|---|---|---|
| WO | 2013173985 A1 | 11/2013 |
| WO | 2014019130 A1 | 2/2014 |
| WO | 2014110495 A1 | 7/2014 |

OTHER PUBLICATIONS

U.S. Appl. No. 29/525,068 for Tablet Computer With Removable Scanning Device filed Apr. 27, 2015 (Schulte et al.); 19 pages.

U.S. Appl. No. 29/468,118 for an Electronic Device Case, filed Sep. 26, 2013 (Oberpriller et al.); 44 pages.

U.S. Appl. No. 29/530,600 for Cyclone filed Jun. 18, 2015 (Vargo et al); 16 pages.

U.S. Appl. No. 14/707,123 for Application Independent DEX/UCS Interface filed May 8, 2015 (Pape); 47 pages.

U.S. Appl. No. 14/283,282 for Terminal Having Illumination and Focus Control filed May 21, 2014 (Liu et al.); 31 pages; now abandoned.

U.S. Appl. No. 14/705,407 for Method and System to Protect Software-Based Network-Connected Devices From Advanced Persistent Threat filed May 6, 2015 (Hussey et al.); 42 pages.

U.S. Appl. No. 14/704,050 for Intermediate Linear Positioning filed May 5, 2015 (Charpentier et al.); 60 pages.

U.S. Appl. No. 14/705,012 Hands-Free Human Machine Interface Responsive to a Driver of a Vehicle filed May 6, 2015 (Fitch et al.); 44 pages.

U.S. Appl. No. 14/715,672 for Augumented Reality Enabled Hazard Display filed May 19, 2015 (Venkatesha et al.); 35 pages.

U.S. Appl. No. 14/735,717 for Indicia-Reading Systems Having an Interface With a User's Nervous System filed Jun. 10, 2015 (Todeschini); 39 pages.

U.S. Appl. No. 14/702,110 for System and Method for Regulating Barcode Data Injection Into a Running Application on a Smart Device filed May 1, 2015 (Todeschini et al.); 38 pages.

U.S. Appl. No. 14/747,197 for Optical Pattern Projector filed Jun. 23, 2015 (Thuries et al.); 33 pages.

U.S. Appl. No. 14/702,979 for Tracking Battery Conditions filed May 4, 2015 (Young et al.); 70 pages.

U.S. Appl. No. 29/529,441 for Indicia Reading Device filed Jun. 8, 2015 (Zhou et al.); 14 pages.

U.S. Appl. No. 14/747,490 for Dual-Projector Three-Dimensional Scanner filed Jun. 23, 2015 (Jovanovski et al.); 40 pages.

U.S. Appl. No. 14/740,320 for Tactile Switch for a Mobile Electronic Device filed Jun. 16, 2015 (Barndringa); 38 pages.

U.S. Appl. No. 14/740,373 for Calibrating a Volume Dimensioner filed Jun. 16, 2015 (Ackley et al.); 63 pages.

Combined Search and Examination Report in counterpart GB Application No. 1615279.5 dated Feb. 6, 2017, pp. 1-7.

U.S. Appl. No. 13/367,978, filed Feb. 7, 2012, (Feng et al.); now abandoned.

U.S. Appl. No. 14/277,337 for Multipurpose Optical Reader, filed May 14, 2014 (Jovanovski et al.); 59 pages; now abandoned.

U.S. Appl. No. 14/446,391 for Multifunction Point of Sale Apparatus With Optical Signature Capture filed Jul. 30, 2014 (Good et al.); 37 pages; now abandoned.

U.S. Appl. No. 29/516,892 for Table Computer filed Feb. 6, 2015 (Bidwell et al.); 13 pages.

U.S. Appl. No. 29/523,098 for Handle for a Tablet Computer filed Apr. 7, 2015 (Bidwell et al.); 17 pages.

U.S. Appl. No. 29/528,890 for Mobile Computer Housing filed Jun. 2, 2015 (Fitch et al.); 61 pages.

U.S. Appl. No. 29/526,918 for Charging Base filed May 14, 2015 (Fitch et al.); 10 pages.

\* cited by examiner

POSITIONING AN OBJECT WITH RESPECT TO A TARGET LOCATION

CROSS-REFERENCE TO RELATED APPLICATION

The present application claims the benefit of U.S. patent application Ser. No. 14/851,645 for Positioning an Object with Respect to a Target Location filed Sep. 11, 2015 (and published Mar. 16, 2017 as U.S. Patent Publication No. 2017/0076125), now U.S. Pat. No. 9,652,648. Each of the foregoing patent application, patent publication, and patent is hereby incorporated by reference in its entirety.

FIELD OF THE INVENTION

The present invention relates to systems and methods for positioning an object with respect to a target location and more particularly relates to motor control systems and methods for quickly and accurately positioning an object.

BACKGROUND

In various environments where optical devices are used to focus on an image or object, achieving a quality image hinges on the accuracy of the focusing process. To simplify the use of some optical equipment, the technology of automatic focusing can be used. Auto-focusing is used in a variety of applications, such as in digital cameras and video cameras. Auto-focus is also used in barcode scanners, precision drafting devices, mechanical actuators, and other devices. In particular, a barcode scanner may comprise an optical grid used in the focusing process.

As used herein, the term "optical grid" may represent a linear or two-dimensional arrangement of optical elements uniformly arranged with a predetermined spacing between them. The optical grid may include light sources for emitting beams of light and light sensors for detecting the light that is reflected off of an image or transmitted through an image. The light sources and light sensors may be paired in a one-to-one ratio. The sensors can be used for distinguishing between dark-shaded or opaque portions and light-shaded or transparent portions of the optical grid.

The auto-focusing device may also include components, such as a range-finder, for calculating the distance to an object. Range-finders can utilize acoustic reflective methods, stereoscopic optical methods, time-of-flight optical methods, patterned light, and other methods known in the art. In one example, a single laser can use the principle of parallax to determine distance. From the calculated distance, a lens can be moved to a target location for auto-focusing. A need exists for controlling quickly and accurately the movement of a device (e.g., a lens) for the purpose of auto-focusing or for other similar purposes related to positioning an object at or near a target location. In this regard, any improvements in the ability to position quickly and accurately an object can be beneficial in auto-focusing technologies used for cameras, barcode scanner, and other devices that may utilize auto-focusing. The process of positioning any object at any target location quickly and accurately is desired in other fields as well.

SUMMARY

Accordingly, the present invention embraces systems and methods for positioning an object at or near a target location. One method described in the present disclosure includes a first step of providing an optical grid having a first set of optical elements and a second set of optical elements, whereby the first set of optical elements is optically distinguishable from the second set of optical elements. The method further includes continuously moving first and second optical sensors in a forward direction and at a constant speed with respect to the first and second sets of optical elements. The first and second optical sensors are offset from each other by a predetermined distance, wherein transitions are encountered when one of the optical sensors senses one of the first set of optical elements and the other of the optical sensors senses one of the second set of optical elements. Also, the method includes sensing when one of the optical sensors reaches a target location and beginning a clock cycle counter when the target location is reached. The method also includes encountering a first transition beyond the target location. The clock cycle counter is stopped when the first transition beyond the target is encountered to obtain a first clock cycle count. The method also includes continuously moving the first and second optical sensors in the forward direction at the constant speed until at least a second optical transition beyond the target is encountered and then stopping the movement of the first and second optical sensors in the forward direction. The method further includes the step of reversing the direction of movement of the first and second optical sensors and continuously moving the first and second optical sensors in a reverse direction and at the constant speed. Then, the first transition beyond the target location is encountered again and a step is executed for beginning the clock cycle counter when the first transition beyond the target is encountered in the reverse direction. The method includes stopping the movement of the first and second optical sensors when the clock cycle counter reaches the first clock cycle count.

In another exemplary embodiment, a positioning device is described in the present disclosure. The positioning device comprises a reference object including a plurality of dark-shaded bars arranged in parallel and separated from each other by spaces equal to a width of each of the bars. The positioning device further includes a motor configured to move in a reciprocating manner with respect to the bars. Also, the positioning device includes first and second sensors connected to the motor, where each of the first and second sensors is configured to sense one of the bars or spaces. The motor is configured to stop at a target location in two phases of motion.

The present disclosure also defines a non-transitory computer-readable medium configured to store a processing sequence executable by a processing device. The processing sequence comprises a sensor motion unit for controlling the movement of at least one sensor in a first direction at a constant velocity with respect to a pattern of optically alternating shades. The processing sequence also includes a transition detecting unit for detecting when the at least one sensor encounters transitions between the optically alternating shades. Furthermore, the processing sequence includes a target detecting unit for detecting a first time when the at least one sensor encounters a target location. Also, the processing sequence comprises a clock cycle counting unit for counting a number of clock cycles from a time when the target detecting unit first encounters the target location to a time when the transition detecting unit encounters a first transition beyond the target location.

The foregoing illustrative summary, as well as other exemplary objectives and/or advantages of the invention, and the manner in which the same are accomplished, are further explained within the following detailed description and its accompanying drawings.

DETAILED DESCRIPTION

The present invention is directed to systems and methods for positioning an object with respect to a target location. For example, the present invention may be incorporated in or may include barcode scanners or other devices (e.g., auto-focus cameras) that utilize a motor for positioning a lens at an optimum location for greatest focus.

Figure 1:
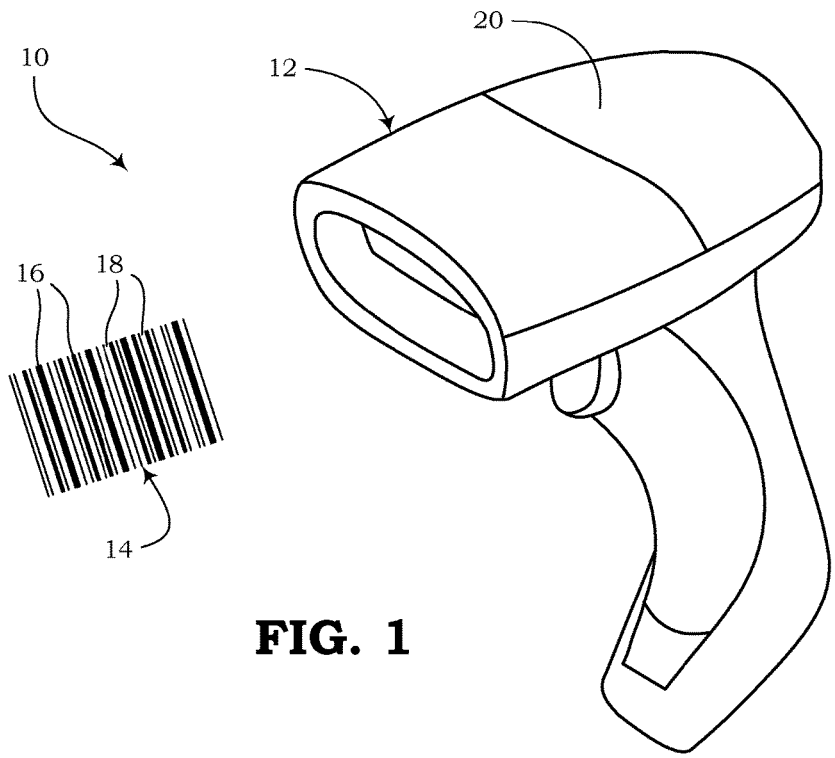
FIG. 1 schematically depicts a barcode scanning system according to an embodiment of the present invention.

FIG. 1 illustrates an embodiment of a barcode scanning system 10 including a barcode scanner 12 and a barcode 14. It should be understood that the barcode scanner 12 may be used to scan other barcodes and the barcode 14 can be scanned by other barcode scanners. The barcode 14, as is known, includes a number of parallel lines 16 or bars having various widths. The lines 16 of the barcode 14 are separated from each other by spaces 18 also having various widths. The barcode scanner 12 includes a housing 20 that contains barcode scanning components therein.

Figure 2:
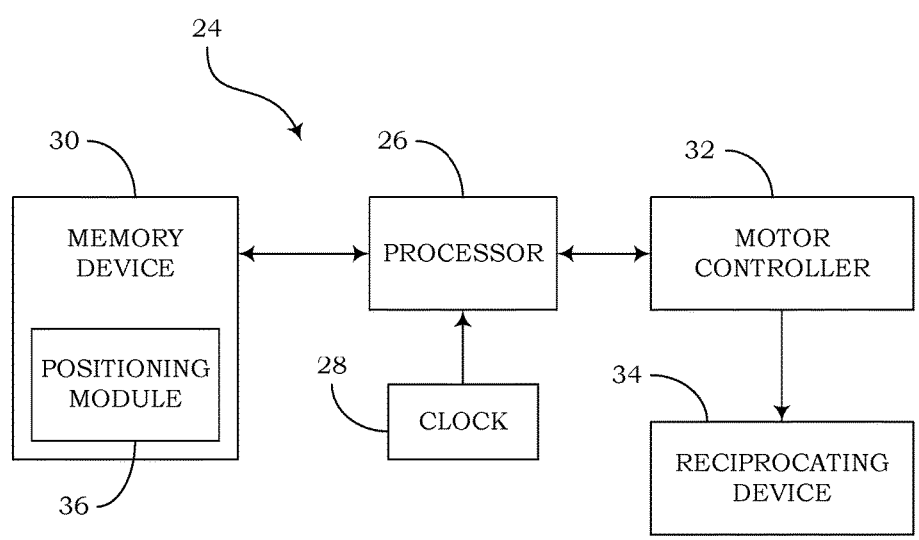
FIG. 2 schematically depicts electrical and mechanical components of a positioning device incorporated in the barcode scanner shown in FIG. 1 according to an embodiment of the present invention.

FIG. 2 is a block diagram showing an embodiment of a positioning device 24, which may be housed within the housing 20 of the barcode scanner 12. According to other embodiments, the positioning device 24 may be used in other devices that perform an auto-focusing feature or that perform a position feature for positioning a lens or other object at a target location.

The positioning device 24 includes both electrical and mechanical components. The electrical components of the positioning device 24 include a processor 26, a clock 28, a memory device 30, and a motor controller 32. The mechanical component of the positioning device 24 includes a reciprocating device 34, which moves in forward and reverse directions and is controlled by electrical signals from the motor controller 32.

In some embodiments, the memory device 30 may store a positioning module 36, which is configured to include logic that is utilized by the processor 26 as instructions so as to enable the processor 26 to position the reciprocating device 34 with respect to a target location. According to various embodiments of the present invention, the positioning module 36 may be configured as software, hardware, firmware, and/or any suitable combination of these. Software of the positioning module 36 may be stored in the memory device 30, while hardware may be configured in the processor 26 or other micro-processing devices of the positioning device 24.

Figure 3A:
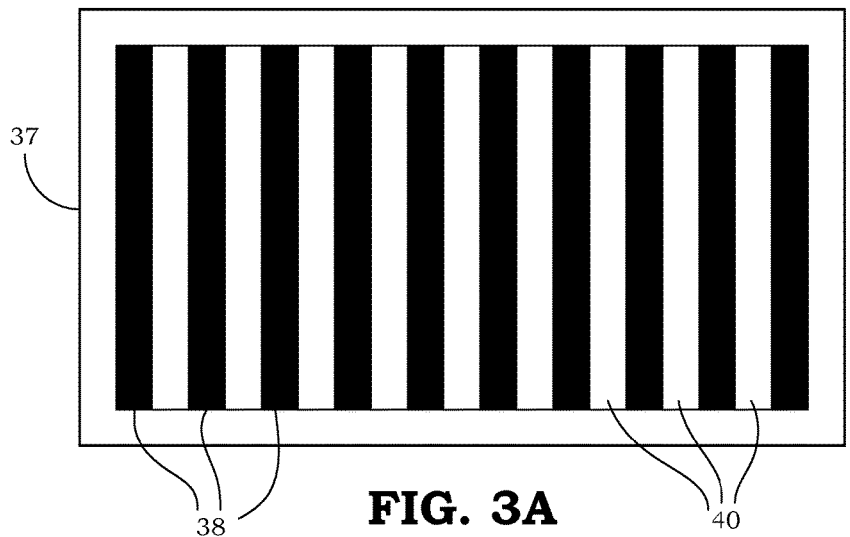
FIG. 3A schematically depicts a reference object of an optical grid according to an embodiment of the present invention.

FIG. 3A illustrates an embodiment of a reference object 37 having a number of parallel dark-shaded or opaque bars 38, each having the same width. The reference object 37 also includes light-shaded or transparent bars 40 or spaces, which separate the dark-shaded bars 38. Each of the light-shaded bars 40 includes the same width, which is also the same width as that of the dark-shaded bars 38.

Figure 3B:
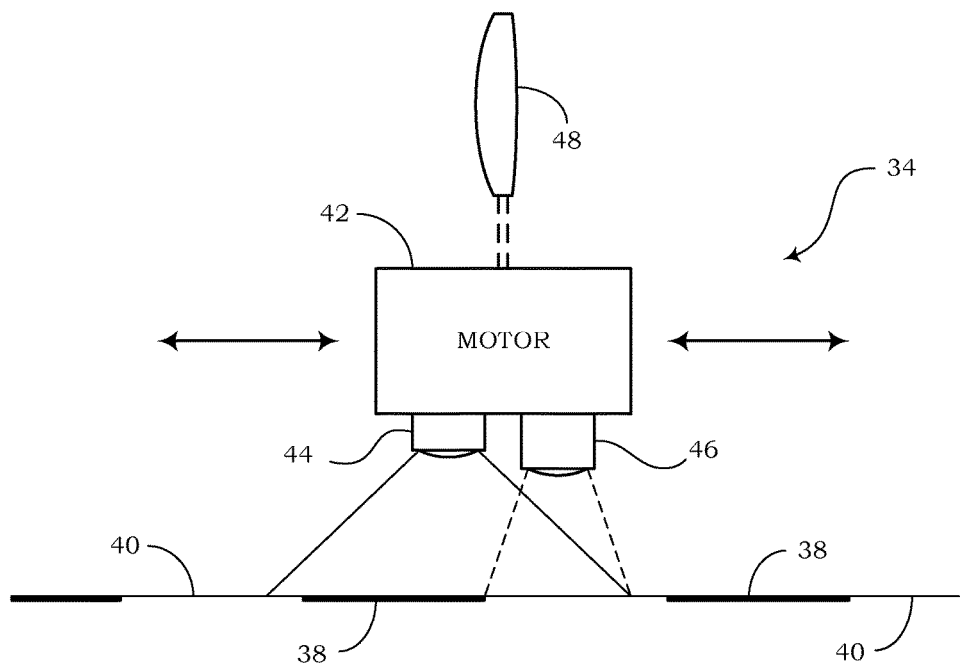
FIG. 3B schematically depicts the reciprocating device shown in FIG. 2 according to a first embodiment of the present invention.

FIG. 3B illustrates a first embodiment of the reciprocating device 34 shown in FIG. 2. The reciprocating device 34 is used in conjunction with the reference object 37 of FIG. 3A. The reciprocating device 34, according to embodiments associated with FIG. 3B, includes a motor 42, a light source 44, and a light sensor 46. Other embodiments may include one or more light sources 44 and at least the same number of light sensors 46. The motor 42 (e.g., a piezo motor) may be directly connected to a lens 48 or other object that is to be positioned at a desired location. Therefore, the lens 48, motor 42, light source 44, and light sensor 46 are connected together and move in unison in a reciprocating manner within the housing 20 of the barcode scanner 12. The movement of the reciprocating device may be transverse to the parallel bars 38, 40 of the reference object 37 shown in FIG. 3A.

Figure 3C:
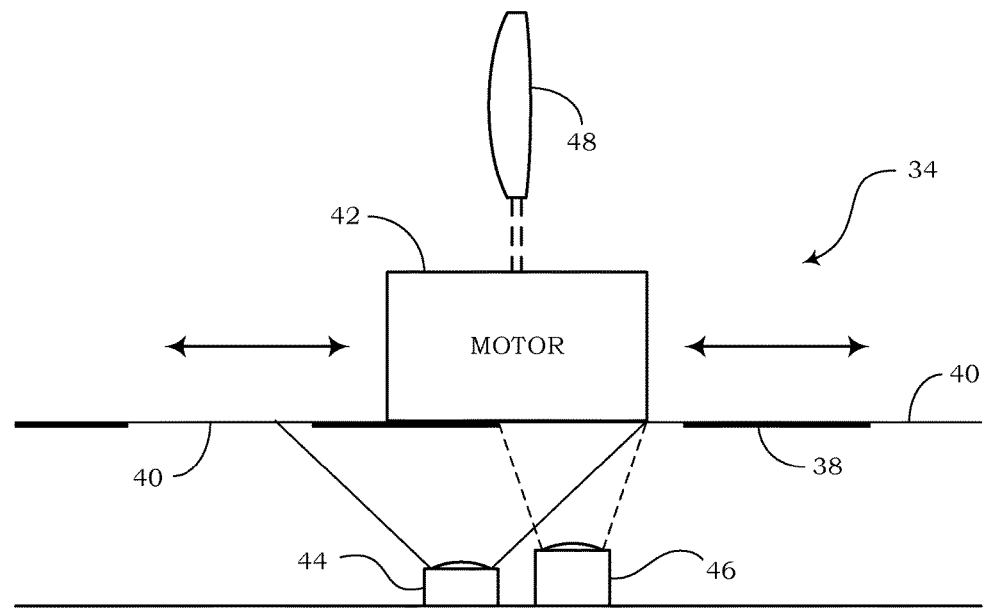
FIG. 3C schematically depicts the reciprocating device shown in FIG. 2 according to another embodiment of the present invention.

FIG. 3C illustrates a second embodiment of the reciprocating device 34 shown in FIG. 2. According to this embodiment, the reciprocating device 34 includes the reference object 37 of FIG. 3A. The reciprocating device 34, according to embodiments associated with FIG. 3C, includes the motor 42 and the reference object 37. The motor 42 moves the reference object 37 with respect to the light source 44 and the light sensor 46 connected at a fixed location inside the housing 20 of the barcode scanner 12. As mentioned above, other embodiments may include one or more light sources 44 and at least the same number of light sensors 46. The motor 42 may be directly connected to the lens 48 or other object that is to be positioned at a desired location. Therefore, the lens 48, motor 42, and reference object 37 are connected together and move in unison in a reciprocating manner within the housing 20 of the barcode scanner 12. The reciprocating device 34 may be moved in this embodiment such that the direction of movement is perpendicular to the parallel bars 38, 40 of the reference object 37.

In operation, a target location of the lens (or other object) is detected or known with respect to the reference object 37. The location may be calculated based on range-finding components in the barcode scanner 12. The range-finding components determine a distance to a subject (e.g., the barcode 14) and correlate this distance to a target location on the reference object 37. For instance, the target location may be determined for providing the best location for focusing other light sensing elements for sensing reflections of light beams from a laser source of the barcode scanner 12 off of the subject (e.g., the barcode 14).

Figure 4:
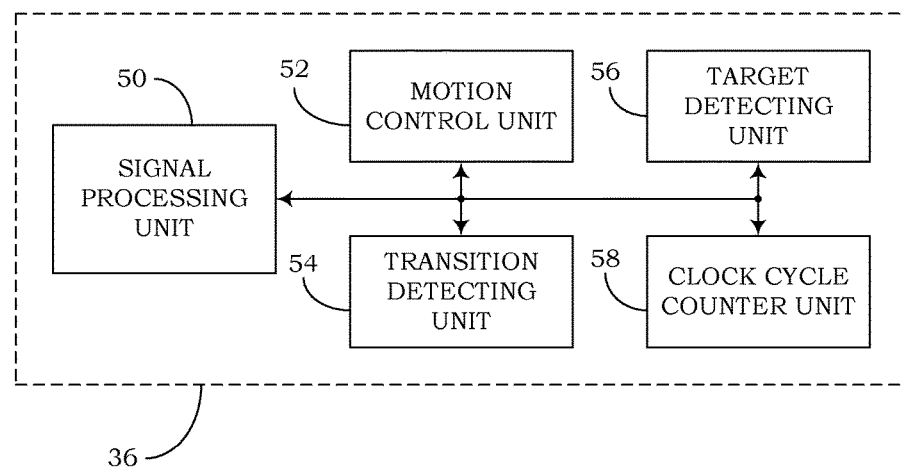
FIG. 4 schematically depicts the positioning module shown in FIG. 2 according to an embodiment of the present invention.

FIG. 4 illustrates an embodiment of the positioning module 36 shown in FIG. 2. In this embodiment, the positioning module 36 includes a signal processing unit 50, a motion control unit 52, a transition detecting unit 54, a target detecting unit 56, and a clock cycle counter unit 58. The signal processing unit 50 receives signals from the sensor 46 or sensors and interprets these signals. The motion control unit 52 controls the movements of the motor 42, which thereby moves the sensor 46 with respect to the reference object 37 (FIG. 3B) or moves the reference object 37 with respect to the sensor 46 (FIG. 3C). Particularly, the motion control unit 52 controls the stopping and starting of the motor and the direction of travel of the motor (e.g., forward or reverse).

The transition detecting unit 54, in some implementations, may be part of the signal processing unit 50 and is used for detecting when the position of the motor is at a transition or border between one of the dark-shaded bars 38 and one of the light-shaded bars 40.

The target detecting unit 56 may receive input from a separate sensor for determining the range or distance to a subject. Thus, when the subject is in focus using a range-finding device, the target detecting unit 56 notes that corresponding location with regard to the relative location of the light sensor 46 with respect to the reference object 37. The details of the process of detecting the target location are described below with respect to FIG. 6.

The clock cycle counter unit 58 operates in conjunction with the signal processing unit 50 based on signals detected by the transition detecting unit 54 and target detecting unit 56. For example, a process for positioning the lens 48 at an optimum location for greatest focus may include a two-phase process according to the teachings of the present invention.

The two-phase process includes a first phase that involves the motion control unit 52 moving the motor 42 (and either the sensor 46 as in FIG. 3B or the reference object 37 as in FIG. 3C) in a first (forward) direction at a constant velocity. The transition detecting unit 54 may be used at this point to determine when a constant velocity is reached, such as by timing from one transition to the next until the times are the same. When the target detecting unit 56 detects the target location, the clock cycle counter unit 58, which has been reset to zero, begins counting the number of clock cycles until the next transition beyond the target location is detected by the transition detecting unit 54.

In the meantime, the motion control unit 52 is moving the motor 42 along in the forward direction at the constant speed and continues to move the motor 42 well beyond the first transition encountered after the target location. After at least one additional transition is detected by the transition detecting unit 54, the motion control unit 52 is configured to stop the motion in the first (forward) direction, which is the end of the first phase.

The second phase begins when the motion control unit 52 reverses the motion of the motor 42 so that it travels in a second (reverse) direction. The reason for travelling well beyond the first transition in the first phase is that when the motion control unit 52 reverses the direction, it takes a short amount of time at the beginning of the second phase for the motor 42 to reach a constant speed.

By the time that the first transition beyond the target is encountered again (this time in the reverse direction), the velocity of the motor is constant. The transition detecting unit 54 detects that first transition again and the clock cycle counter unit 58, which again has been reset to zero, begins counting clock cycles a second time. When the clock cycle count reaches the same count that was detected when the motor 42 was travelling in the forward direction, the clock cycle counter unit 58 signals the motion control unit 52 to stop the motor 42. Thus, the motor 42 can be stopped accurately and quickly at the target location.

Figure 5:
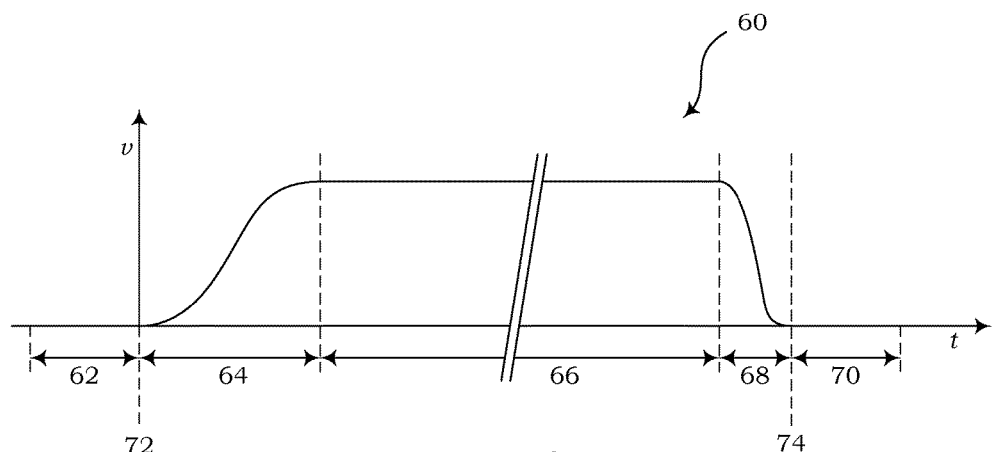
FIG. 5 graphically depicts the velocity of the motor shown in FIG. 3 according to an embodiment of the present invention.

FIG. 5 shows a graph 60 depicting an exemplary operation of the motor 42 shown in FIGS. 3B and 3C according to one implementation. The graph 60 shows the velocity of the motor 42 over time when the motor 40 is travelling in either a forward direction or reverse direction. The stages of velocity of the motor 40 can be defined by a first rest stage 62, an acceleration stage 64, a constant velocity stage 66, a deceleration stage 68, and a second rest stage 70.

The time period for the first and second rest stages 62, 70 may include any length of time and may even be zero if the operation of the motor 40 immediately follows or is immediately followed by an operation of the motor 40 in the opposite direction. Also, the constant velocity stage 66 may include an indefinite length of time and may even be zero if the deceleration stage 68 closely follows the acceleration stage 64.

Figure 6:
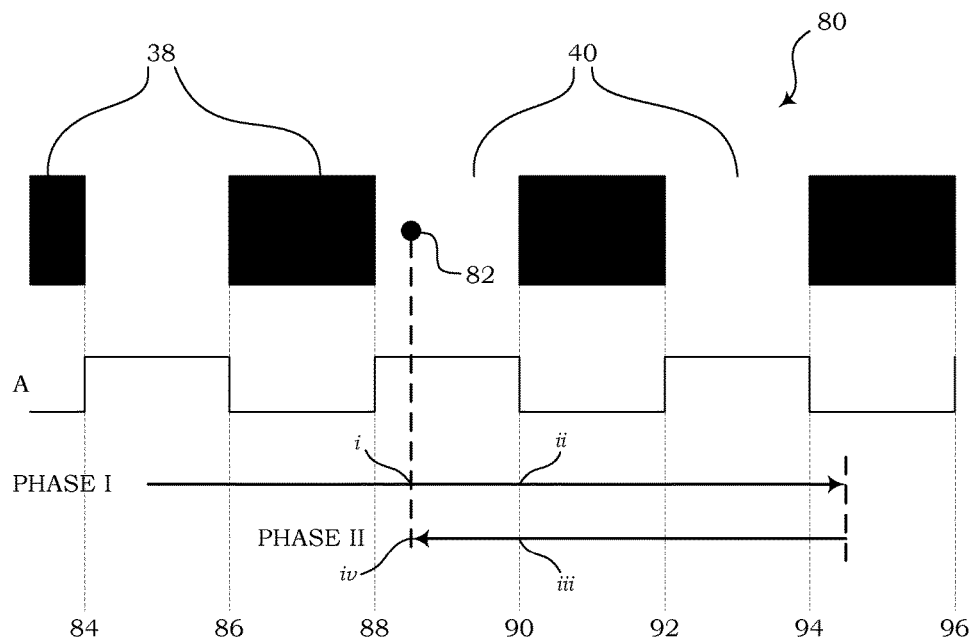
FIG. 6 graphically depicts the operation of the reciprocating device shown in FIG. 2 in spatial relationship with the reference object shown in FIG. 3A according to an embodiment of the present invention.

FIG. 6 is a graph 80 showing signals obtained by the light sensor 46. The graph 80 illustrates a small section of the dark-shaded or opaque bars 38 and light-shaded or transparent bars 40 of the reference object 37. The graph 80 also shows a target location 82. The target location 82 corresponds to the place where the motor 42 is to be positioned. One goal of the present invention includes positioning the motor 42 as close to the target location 82 as quickly and accurately as possible.

In operation, the light source 44 illuminates the reference object 37. The light sensor 46 and reference object 37 are moved with respect to each other by the motor 42 in a reciprocating fashion. In particular, the light sensor 46 or reference object 37 is moved while the other remains fixed, whereby the relative direction of movement is substantially perpendicular with respect to the bars 38, 40. At a constant velocity, the light sensor 46 obtains signal A.

Light sensor 46 is configured to detect the light reflected from the bars 38, 40. Therefore, a dark-shaded bar 38 provides little or no reflection, designated by a low value (e.g., zero) in signal A and a light-shaded bar 40 provides great or maximum reflection, designed by a high value (e.g., one) in signal A.

Since the width of the dark-shaded bars 38 and light-shaded bars 40 are configured with equal widths in some embodiments, and since the bars 38, 40 are scanned at a constant velocity, signal A will have a square-wave shape, as shown. It should be noted that signal A is illustrated with respect to time, but is also matched up with the physical features of the reference object 37 in the physical realm to show the results obtain with respect to the bars 38, 40 when scanned at a constant velocity.

Transitions 84, 86, 88, 90, 92, 94, and 96 are encountered when the light sensor 46 detects a change from a dark-shaded bar 38 to a light-shaded bar 40 or from a light-shaded bar 40 to a dark-shaded bar 38. As used herein, the term "transition" refers to the border between the dark-shaded bars 38 and light-shaded bars 40. The transitions 84, 86, 88, 90, 92, 94, and 96 can be utilized by the processor 26 as a reference for locating the target 82 with respect to the bars 38, 40.

Also shown in the graph 80 of FIG. 6 is a first phase (Phase 1), which shows the relative movement between the light sensor 46 and the bars 38, 40 at a constant velocity in a first direction. Point i shows the point when the target detecting unit 56 detects the target 82. At this point, the scanning continues at the constant velocity in the first direction and the clock cycle counter unit 58 is started. The clock cycle counter unit 58 is configured to count the number of clock cycles of the clock 28 from the starting point i when it is first started until point ii when the first transition 90 beyond the target 82 is reached. At this point (i.e., point ii), the clock cycle counter unit 58 is stopped and the number of clock cycles that were counted is stored in the memory device 30 to be used at a later time, as will be explained below.

Phase 1, showing the scanning in the first direction, continues at the constant velocity beyond the target 82, beyond the first encountered transition 90, and beyond at least one additional transition (e.g., 92, 94, 96). The reason for travelling beyond the target 82 to such an extent is that when the motor 40 decelerates (i.e., during the deceleration stage 68) to a momentary stop and then immediately reverses direction, the motor 40 must go through the acceleration stage 64 in the reverse direction to reach the constant velocity stage 66 before the first transition 90 beyond the target 82 is encountered again.

Phase 2, showing the scanning in the opposite direction from the first direction, includes accelerating to the constant velocity stage 66. The at least one additional transition 92, 94, 96 is encountered during Phase 2 and then the first transition 90 beyond the target 82 is encountered while travelling at a constant velocity. At point iii, the first transition 90 is encountered and the clock cycle counter unit 58, which has been reset, is started again. The clock count is compared with the original clock count to determine when the same number of clock counts is encountered in the reverse direction. When the clock counts are the same at point iv, the motor 42 stops at the target location 82.

Figure 7:
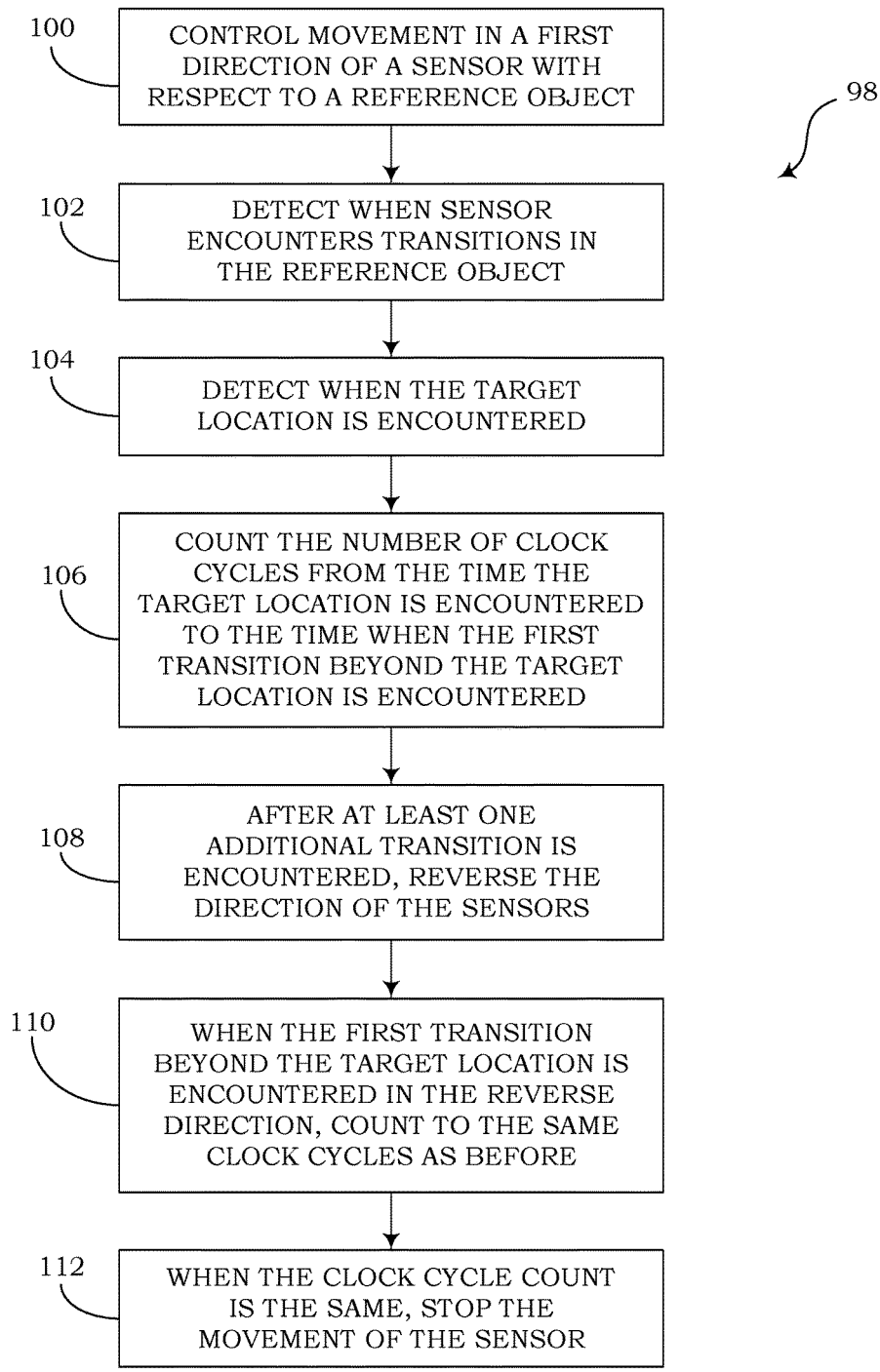
FIG. 7 schematically depicts a flow diagram showing the operation of the positioning module shown in FIG. 2 according to an embodiment of the present invention.

FIG. 7 is a flow diagram showing an embodiment of a method 98 of operation of the positioning module 36 shown in FIGS. 2 and 4. The method 98 includes a first block 100, which indicates that a step is executed to control the movement in a first direction of a sensor (e.g., sensor 46) with respect to a reference object (e.g., reference object 37). According to the embodiments of FIGS. 3B and 3C, either the sensor or reference object can be moved with respect to the other. Block 102 indicates that a step is executed to detect when the sensor encounters transitions in the reference object (e.g., transitions from white-to-black, black-to-white, light-to-dark, dark-to-light, transparent-to-opaque, opaque-to-transparent, etc.).

In block 104, the method 98 includes detecting when the target location is encountered. For instance, the step depicted by block 104 may include a range-finding method, such as a single laser using parallax. Block 106 indicates the step of counting the number of clock cycles from the time the target location is encountered to the time when the first transition beyond the target location is encountered. After at least one additional transition is encountered, the direction of the sensors is reversed, as indicated in block 108. Reversing the direction of the sensors marks the end of Phase I and the start of Phase II, as mentioned above.

The method 98 of FIG. 7 further includes block 110, which indicates that a step is executed such that when the first transition beyond the target location is encountered in the reverse direction, a new count begins to count to the same clock cycle count as before. When the same clock cycle count is reached, according to block 112, the sensor is stopped.

At this stopped location, the positioning process is complete and the object to be moved has been quickly and accurately positioned at the desired place. With respect to the barcode scanner 12, the process can be used to position the location of a lens for focusing on the barcode 14 at a target location defined as the optimum place to achieve the greatest focus.

It should be understood that the routines, steps, processes, or operations described herein may represent any module or code sequence that can be implemented in software or firmware. In this regard, these modules and code sequences can include commands or instructions for executing the specific logical routines, steps, processes, or operations within physical components. It should further be understood that two or more of the routines, steps, processes, and/or operations described herein may be executed substantially simultaneously or in a different order than explicitly described, as would be understood by one of ordinary skill in the art.

* * *

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;
U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;

U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,525;
U.S. Pat. No. 8,794,526; U.S. Pat. No. 8,798,367;
U.S. Pat. No. 8,807,431; U.S. Pat. No. 8,807,432;
U.S. Pat. No. 8,820,630; U.S. Pat. No. 8,822,848;
U.S. Pat. No. 8,824,692; U.S. Pat. No. 8,824,696;
U.S. Pat. No. 8,842,849; U.S. Pat. No. 8,844,822;
U.S. Pat. No. 8,844,823; U.S. Pat. No. 8,849,019;
U.S. Pat. No. 8,851,383; U.S. Pat. No. 8,854,633;
U.S. Pat. No. 8,866,963; U.S. Pat. No. 8,868,421;
U.S. Pat. No. 8,868,519; U.S. Pat. No. 8,868,802;
U.S. Pat. No. 8,868,803; U.S. Pat. No. 8,870,074;
U.S. Pat. No. 8,879,639; U.S. Pat. No. 8,880,426;
U.S. Pat. No. 8,881,983; U.S. Pat. No. 8,881,987;
U.S. Pat. No. 8,903,172; U.S. Pat. No. 8,908,995;
U.S. Pat. No. 8,910,870; U.S. Pat. No. 8,910,875;
U.S. Pat. No. 8,914,290; U.S. Pat. No. 8,914,788;
U.S. Pat. No. 8,915,439; U.S. Pat. No. 8,915,444;
U.S. Pat. No. 8,916,789; U.S. Pat. No. 8,918,250;
U.S. Pat. No. 8,918,564; U.S. Pat. No. 8,925,818;
U.S. Pat. No. 8,939,374; U.S. Pat. No. 8,942,480;
U.S. Pat. No. 8,944,313; U.S. Pat. No. 8,944,327;
U.S. Pat. No. 8,944,332; U.S. Pat. No. 8,950,678;
U.S. Pat. No. 8,967,468; U.S. Pat. No. 8,971,346;
U.S. Pat. No. 8,976,030; U.S. Pat. No. 8,976,368;
U.S. Pat. No. 8,978,981; U.S. Pat. No. 8,978,983;
U.S. Pat. No. 8,978,984; U.S. Pat. No. 8,985,456;
U.S. Pat. No. 8,985,457; U.S. Pat. No. 8,985,459;
U.S. Pat. No. 8,985,461; U.S. Pat. No. 8,988,578;
U.S. Pat. No. 8,988,590; U.S. Pat. No. 8,991,704;
U.S. Pat. No. 8,996,194; U.S. Pat. No. 8,996,384;
U.S. Pat. No. 9,002,641; U.S. Pat. No. 9,007,368;
U.S. Pat. No. 9,010,641; U.S. Pat. No. 9,015,513;
U.S. Pat. No. 9,016,576; U.S. Pat. No. 9,022,288;
U.S. Pat. No. 9,030,964; U.S. Pat. No. 9,033,240;
U.S. Pat. No. 9,033,242; U.S. Pat. No. 9,036,054;
U.S. Pat. No. 9,037,344; U.S. Pat. No. 9,038,911;
U.S. Pat. No. 9,038,915; U.S. Pat. No. 9,047,098;
U.S. Pat. No. 9,047,359; U.S. Pat. No. 9,047,420;
U.S. Pat. No. 9,047,525; U.S. Pat. No. 9,047,531;
U.S. Pat. No. 9,053,055; U.S. Pat. No. 9,053,378;
U.S. Pat. No. 9,053,380; U.S. Pat. No. 9,058,526;
U.S. Pat. No. 9,064,165; U.S. Pat. No. 9,064,167;
U.S. Pat. No. 9,064,168; U.S. Pat. No. 9,064,254;
U.S. Pat. No. 9,066,032; U.S. Pat. No. 9,070,032;
U.S. Design Patent No. D716,285;
U.S. Design Pat. No. D723,560;
U.S. Design Pat. No. D730,357;
U.S. Design Pat. No. D730,901;
U.S. Design Pat. No. D730,902
U.S. Design Pat. No. D733,112;
U.S. Design Patent No. D734,339;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;

U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;
U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);

U.S. patent application Ser. No. 14/150,393 for Indicia-reader Having Unitary Construction Scanner, filed Jan. 8, 2014 (Colavito et al.);

U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 29/486,759 for an Imaging Terminal, filed Apr. 2, 2014 (Oberpriller et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/334,934 for a SYSTEM AND METHOD FOR INDICIA VERIFICATION, filed Jul. 18, 2014 (Hejl);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/483,056 for VARIABLE DEPTH OF FIELD BARCODE SCANNER filed Sep. 10, 2014 (McCloskey et al.);

U.S. patent application Ser. No. 14/513,808 for IDENTIFYING INVENTORY ITEMS IN A STORAGE FACILITY filed Oct. 14, 2014 (Singel et al.);

U.S. patent application Ser. No. 14/519,195 for HAND-HELD DIMENSIONING SYSTEM WITH FEEDBACK filed Oct. 21, 2014 (Laffargue et al.);

U.S. patent application Ser. No. 14/519,179 for DIMENSIONING SYSTEM WITH MULTIPATH INTERFERENCE MITIGATION filed Oct. 21, 2014 (Thuries et al.);

U.S. patent application Ser. No. 14/519,211 for SYSTEM AND METHOD FOR DIMENSIONING filed Oct. 21, 2014 (Ackley et al.);

U.S. patent application Ser. No. 14/519,233 for HAND-HELD DIMENSIONER WITH DATA-QUALITY INDICATION filed Oct. 21, 2014 (Laffargue et al.);

U.S. patent application Ser. No. 14/519,249 for HAND-HELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for positioning an object, the method comprising the steps of:
providing an optical grid having a first set of optical elements and a second set of optical elements, the first set of optical elements being optically distinguishable from the second set of optical elements;
moving an optical sensor in a forward direction with respect to the optical grid, wherein transitions are encountered when the optical sensor senses a border between one of the first set of optical elements and one of the second set of optical elements;
beginning a clock cycle counter when a target location is reached;
stopping the clock cycle counter when a first transition beyond the target location is encountered to obtain a first clock cycle count;
continuously moving the optical sensor in the forward direction until at least a second transition beyond the target location is encountered;
reversing the direction of movement of the optical sensor and moving the optical sensor in a reverse direction;
resetting and beginning the clock cycle counter a second time when the first transition beyond the target location is encountered in the reverse direction; and
stopping the movement of the optical sensor when the clock cycle counter reaches the first clock cycle count.

2. The method of claim 1, wherein the optical sensor is coupled in a fixed relationship to the object, whereby the object is positioned with respect to the target location.

3. The method of claim 1, wherein the first set of optical elements includes a plurality of parallel dark-shaded or opaque bars and the second set of optical elements includes a plurality of parallel light-shaded or transparent bars, the dark-shaded or opaque bars being parallel with and interspersed with the light-shaded or transparent bars.

4. The method of claim 3, wherein the width of each of the bars of the first and second sets of optical elements is the same.

5. The method of claim 1, comprising utilizing a piezo motor to move the optical sensor in the forward and reverse directions.

6. The method of claim 1, wherein the target location is positioned between two adjacent transitions.

7. The method of claim 1, wherein at least the second transition beyond the target location includes a plurality of transitions.

8. A method comprising:
moving, to a target location, either
a reference object including a plurality of shaded or opaque bars arranged in parallel with and separated from each other by spaces or
a sensor configured to sense at least one of the bars and spaces of the reference object,
wherein the moving to the target location consists essentially of:
moving in a forward direction, with a motor, either the reference object or the sensor;
stopping the movement in the forward direction;
moving in a reverse direction, with the motor, either the reference object or the sensor; and stopping the movement in the reverse direction, comprising stopping, with the motor, either the reference object or the sensor at the target location.

9. The method of claim 8, wherein:
the method comprises sensing the target location while moving in the forward direction, and counting clock cycles until a first transition beyond the target location is encountered; and
the stopping the movement in the forward direction comprises stopping after at least a second transition beyond the target location is reached.

10. The method of claim 9, wherein:
the counting the clock cycles until the first transition beyond the target location is encountered provides a first count; and
the method comprises:
beginning counting, during the moving in the reverse direction, clock cycles when the first transition beyond the target location is reached to provide a second count, and
stopping the movement of the motor when the second count is the same as the first count.

11. The method of claim 10, wherein each transition is an intersection between a bar and a space.

12. The method of claim 8, wherein a plurality of sensors are arranged on the motor.

13. The method of claim 8, wherein an optical lens is connected to the motor.

14. The method of claim 8, wherein the motor is incorporated in a housing of a barcode scanner.

15. A method, comprising:
moving an optical sensor in a forward direction with respect to an optical grid, wherein the optical grid comprises a first set of optical elements and a second set of optical elements, the first set of optical elements being optically distinguishable from the second set of optical elements, wherein transitions are encountered when the optical sensor senses a border between one of the first set of optical elements and one of the second set of optical elements;
beginning a clock cycle counter when a target location is reached;
stopping the clock cycle counter when a first transition beyond the target location is encountered to obtain a first clock cycle count;
continuously moving the optical sensor in the forward direction until at least a second transition beyond the target location is encountered;
reversing the direction of movement of the optical sensor and moving the optical sensor in a reverse direction;
resetting and beginning the clock cycle counter a second time when the first transition beyond the target location is encountered in the reverse direction; and
stopping the movement of the optical sensor when the clock cycle counter reaches the first clock cycle count.

16. The method of claim 15, wherein the optical sensor is coupled in a fixed relationship to the object, whereby the object is positioned with respect to the target location.

17. The method of claim 15, wherein the first set of optical elements includes a plurality of parallel dark-shaded or opaque bars and the second set of optical elements includes a plurality of parallel light-shaded or transparent bars, the dark-shaded or opaque bars being parallel with and interspersed with the light-shaded or transparent bars.

18. The method of claim 17, wherein the width of each of the bars of the first and second sets of optical elements is the same.

19. The method of claim 15, comprising utilizing a piezo motor to move the optical sensor in the forward and reverse directions.

20. The method of claim 15, wherein the target location is positioned between two adjacent transitions.

* * * * *